INVENTOR.
James H. Bornzin
BY Paul O. Pippel
Atty.

United States Patent Office 2,909,989
Patented Oct. 27, 1959

2,909,989

HAY FEEDING MECHANISM FOR BALERS

James H. Bornzin, La Grange, Ill., assignor to International Harvester Company, Chicago, Ill., a corporation of New Jersey Application February 27, 1957, Serial No. 642,834

4 Claims. (Cl. 100—142)

This invention relates to a new and improved hay feeding mechanism for balers.

The smooth continuous feeding of hay from windrows in a field to the bale-forming chamber is a constant challenge to agricultural machine engineers. The problem has been variously solved by conveyers of one type or another and in combination with each other and yet the constant search continues for an even better continuously uninterrupted flow of hay from the field to the bale-forming chamber. The present invention contemplates a result very similar to that shown in the co-pending application Serial No. 419,686, now Patent No.2,787,949, in which I am a co-inventor.

It is therefore a principal object of the present invention to provide means on a baler feed mechanism for contributing to the uniform flow of hay from a windrow in the field to a bale-forming chamber.

An important object of this invention is the provision of means in a hay baler of the type having an auger conveyer for feeding hay transversely of a receiving platform and in which the hay on the platform is fed through an unjournalled discharging end of the auger conveyer and having means for cooperating with the auger for pushing the hay from its position adjacent the open discharge end of the auger rearwardly therefrom into the path of clawing-type fingers which feed the hay into a bale-forming chamber.

Another important object of this invention is to supply means in a hay baler for facilitating the positive removal of material from the discharge end of a platform auger by spring mounted fingers movable with a reciprocating bale-forming plunger whereby the fingers extend as the plunger moves in its compression stroke to carry the hay from the open discharge end of the auger conveyer into the path of packer fingers which carry the hay from the platform into the bale-forming chamber.

Another and further important object of this invention is to equip a hay baler with spring extended fingers on the side of a reciprocating plunger used to compress hay within a bale-forming chamber and whereby the fingers retract within notches in the side of the plunger upon the retracted stroke of the plunger.

Still another important object of this invention is to provide spring mounted fingers on the side of a reciprocating compressing plunger having notched means in the platform structure adjacent the receiving opening in the bale-forming chamber whereupon the spring fingers may extend outwardly to cause a movement of hay from the end of a discharging auger conveyer into the path of packer fingers which gyrate transversely through a path immediately to the rear of the platform auger and into the bale-forming chamber and whereby the spring extended fingers carried by the plunger move the hay into position within the path of the packer fingers and upon retraction of the plunger the fingers are folded in closely adjacent the plunger for sliding within the bale-forming chamber.

Other and further important objects and advantages will become apparent from the disclosure in the following specification and accompanying drawings:

Figure 2:
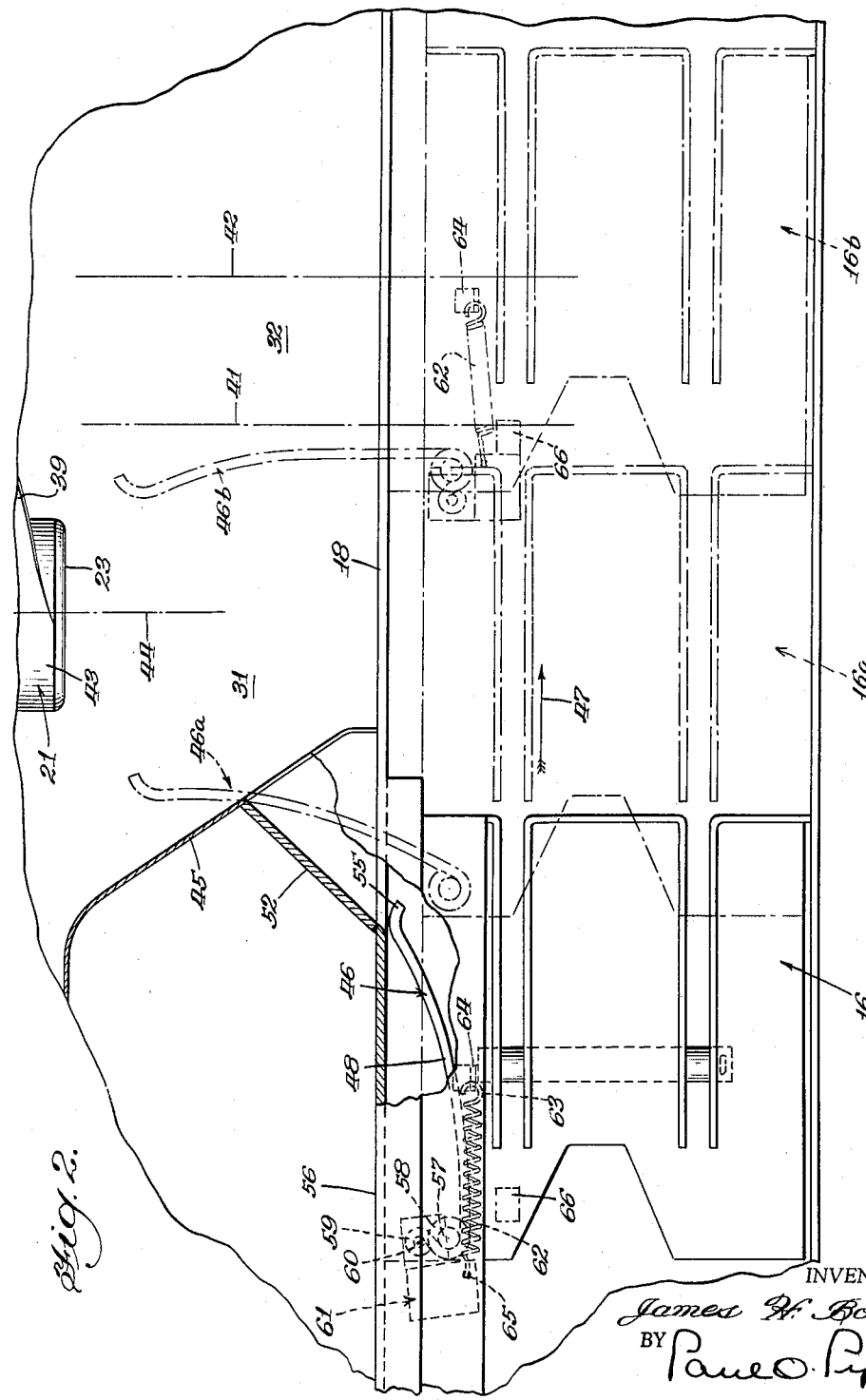
Figure 2 is an enlarged top view of a portion of a bale-forming chamber with the top removed to show the reciprocating plunger and spring extended hay conveying fingers.
Figure 3:
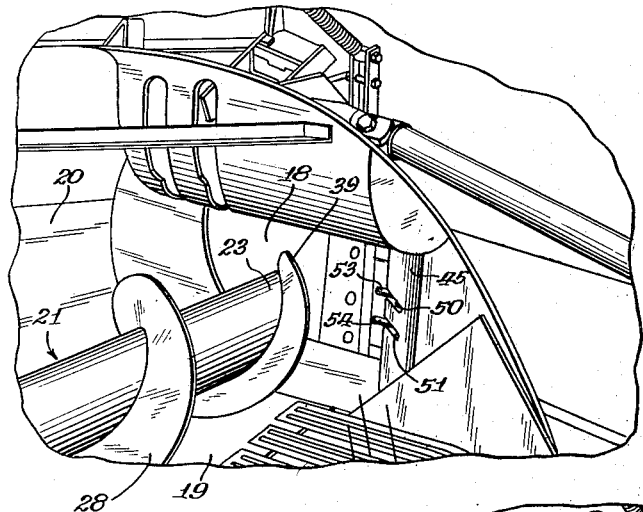
Figures 3 is a perspective view detail of the juncture between the baler platform and the bale-forming chamber.

As shown in the drawings the reference numeral 10 indicates generally a hay baler having a hitch mechanism 11 at the forward end thereof for attachment to the drawbar of a pulling tractor (not shown). The baler 10 includes generally a longitudinally extending bale-forming chamber 12 and a laterally extending platform 13 which is adapted to pick up hay from a windrow and deliver it into the bale-forming chamber 12. The baler 10 is carried on spaced apart ground-engaging wheels 14 and 15 and as the tractor pulls on the hitch mechanism 11 the wheels ride the ground for easy transportation of the implement. The bale-forming chamber has a plunger 16 which is reciprocably driven therein by means of a pitman 17 and other mechanism (not shown). The plunger 16 is adapted to move from its full line position as shown in Figure 2 to the dashed line position wherein the forward end thereof has moved across the side opening 18 in the bale-forming chamber 12.

The platform 13 has a deck portion 19 and a back wall 20 of gradually increasing width from the outer end thereof to a position adjacent the side opening 18 in the bale-forming chamber 12. This means that the deck of the platform is substantially deeper at the point of delivery of hay to the bale-forming chamber. A transversely disposed auger conveyer 21 is generally mounted at its outer end in an end wall 22 whereas the inner end 23 of the auger is free and unjournalled to permit the passage of hay therethrough without entanglement. A pickup cylinder 24 is adapted to lift hay 25 from a field windrow. A hold-down member 26 is pivoted at its forward end on a bail-like bracket 27. The hold-down member 26 is adapted to exert a downward pressure on the hay 25 over the pickup cylinder 24 whereupon the hay is delivered to the underside of the auger conveyer 21. Although the auger conveyer 26 is disposed at right angles to the longitudinally extending line of draft of the implement the spiral flight 28 thereon causes the hay, now designated by the numeral 29, to move in a generally angular direction coinciding substantially with the angularly disposed front edge 30 of the rear wall 20 of the platform 13.

Certain of the hay is discharged directly through the unjournalled end 23 of the auger into a space designated as 31. The forward motion of the hay baler of this invention through a field is normally sufficient to cause any hay reaching the space 31 to be moved rearwardly into a space 32 through which reciprocating packer or material clawing fingers 33 and 34 operate to carry the hay from the platform 13 into and through the side opening 18 of the bale-forming chamber 12. This is true because the incoming hay tends to push the previously harvested hay rearwardly. The packer fingers 33 and 34 are mounted on top of the bale-forming chamber 12 and are adapted to move as in Crumb et al, Patent 2,450,082 in a sweeping motion through the space 32 by operation through elongated slots 35 and 36 in a top sheet or cover member 37. This top sheet 37 extends from the top of the bale-forming chamber 12 and thence laterally outwardly and upwardly to a terminal edge 38 substantially in alignment with the inner terminal end 23 of the auger conveyer 21.

Attention is directed to the construction of the spiral flight 28 on the auger conveyer 21 wherein the last convolution 39 thereof adjacent the discharge end 23 is of a lesser diameter than the remaining extent of the screw flight in order to provide adequate clearance between the packer finger 33 and the auger. It should be noted that the packer finger 33 has its outer edge in direct alignment with the second convolution of the auger flight 28. This insures positive control of the hay throughout the transportation of hay from the windrow 25 into the bale-forming chamber 12 whereupon the hay is compressed and packaged into bales as shown at 40. Attention is directed to Figure 2 of the drawings wherein the center line of the packing finger 33 is shown at 41 and the center line of the packing finger 34 is shown at 42. The auger 21 has its core 43 on a transverse axis 44 which lies parallel to and forwardly of the center line 41 of the packing finger 33.

In order to eliminate any possibility of failure to clear the chamber 31 of harvested hay means is provided for sweeping through the chamber 31 to the chamber 32 whereupon the gyrating packing fingers 33 and 34 may positively carry the hay inwardly through the opening 18 in the side of the bale-forming chamber whereupon the reciprocating plunger 16 may compress the hay into bales 40. The forward side of the chamber 31 is defined by an angled wall 45 which is adapted to guide the hay inwardly and rearwardly toward the opening 18 in the bale-forming chamber 12. The inside of the chamber 31 may be arbitrarily defined as the side wall of the bale-forming chamber and similarly the outer extent of the chamber 31 may be considered to be the open discharging end 23 of the transverse auger conveyer 21. In some conditions of hay this area 31 may be a "dead" space through which the hay will not easily travel. As stated above it is the object of this invention to transmit hay in the space 31 actively by positive means and thereupon move or sweep the hay rearwardly into the area 32 to be taken again positively by the gyrating packing fingers 33 and 34 into the bale-forming chamber 12.

Folding spring fingers generally designated as 46 are associated with the reciprocating plunger 16 and as clearly shown in Figure 2 when the plunger is fully retracted the spring fingers are folded close to and in fact nestled within the side of the plunger 16. A first advanced position of the plunger 16 is shown in dashed lines at 16a and a second or completely advanced position of the plunger 16 is shown at 16b. This position 16b of the plunger is in the fully compressed position of the stroke. The intermediate position 16a shows the spring fingers now at 46a and the final position of the plunger at 16b and the fingers are indicated at 46b. It is thus obvious that as the plunger moves rearwardly in its compression stroke as indicated by the arrow 47 the hay in the area 31 is positively moved rearwardly into the area 32 by the spring fingers 46. This insures the continuous removal of hay from the position at the discharging end 23 of the auger 21 to the area 32 through which the packer fingers operate.

Figure 4:
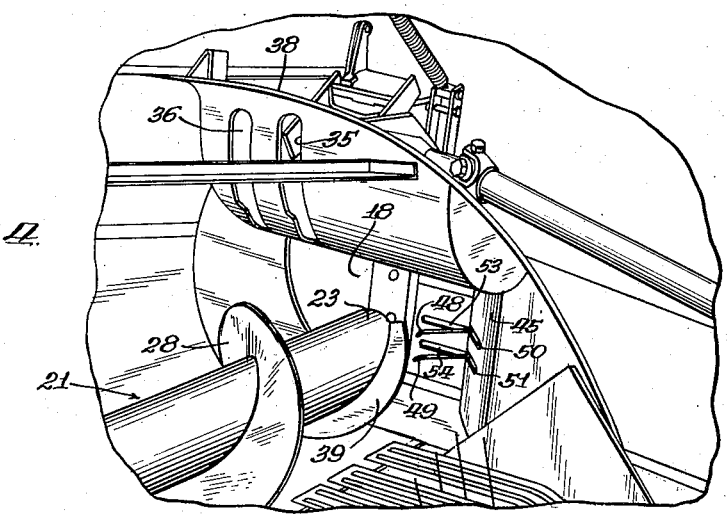
Figure 4 is another perspective view similar to that shown in Figure 3 with the plunger at a position still further on its compression stroke and showing the emergence of the spring extended fingers of this invention.
Figure 5:
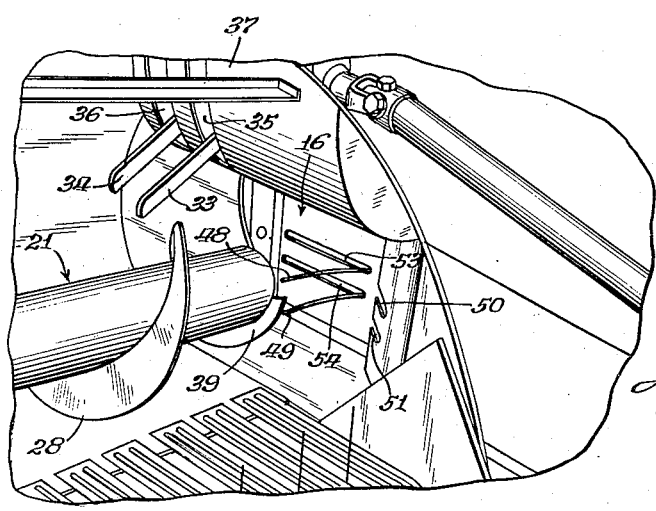
Figure 5 is still another perspective view detail similar to figures 3 and 4 with the plunger still further on its compression stroke.

As best shown in Figures 4 and 5 the spring folding fingers 46 constitute a pair of fingers 48 and 49 which initially emerge outwardly from the plunger 16 through slots 50 and 51 cut inwardly of the inclined forward wall 45. As shown in Figure 2 the slot 50 is defined by a laterally and forwardly inclined wall 52. The wall 52 extends from a position substantially midway of the inclined wall 45 to the side of the bale-forming chamber 12. The one side of the plunger 16 is equipped with elongated slots or notches 53 and 54 which are adapted to receive the spring fingers 48 and 49 when they are in their retracted position as shown in Figure 2 in the full line position of the plunger 16. As best shown in Figure 2 the spring finger 48 and similarly the spring finger 49 disposed therebeneath have their outer ends formed in a curve as shown at 55 so that the fingers may ride along the inside of the wall 56 of the bale-forming chamber 12 without any tendency to dig into the wall. Immediately upon the spring fingers arriving at the opening 18 in the wall 56 they swing outwardly through the opening and through the notch 50 as defined by the angular wall 52.

The inner end of the spring finger 48 is carried on a vertically disposed rod 57 as shown at 58. The attachment 58 of the spring finger 48 constitutes a winding or wrapping of the spring rod material around the shaft 57 with the end anchored at 59 on a pin 60. A bracket or plate-like member 61 is welded or otherwise fastened to the vertical post or shaft 57 and also carries with it the pin 60 which anchors the end 59 of the spring winding 58 about the vertical shaft 57. The shaft 57 is journalled on the plunger 16 and thus is capable of rotational movement therein. The bracket 61 moves with the rod 57 as the rod is rotated. A spring 62 is anchored at its one end 63 to a fixed bracket or support 64 on the plunger 16 and at its other end 65 is mounted on the bracket or plate member 61. Thus the bracket 61 is urged in a rotational movement about the post 57 by reason of the spring 62 pulling on the lower portion of the bracket 61 as viewed in Figure 2. A stop 66 is mounted on the plunger 16 and limits the rotational movement of the plate 61 by its contact thereof. The contact of the bracket plate 61 with the stop 66 is shown in the dot-dash position of the plunger in Figure 2 wherein the spring fingers are fully extended as shown at 46b. The finger 49 located directly beneath the finger 48 is identical thereto and also is mounted on the vertical shaft 47 which is rotated by rotation of the plate bracket 61. Thus the spring arms 48 and 49 move inwardly and outwardly together as a pair of spring fingers.

The functional features of the invention have now been described. The means for driving the operating parts of the baler of this invention are not pertinent with respect to this invention and hence they have not been shown in detail nor have they been described in anything more than general terms. If it is desired to know more concerning the driving features of this baler attention is directed to the Crumb et al. Patent 2,450,082 and to the Bornzin et al. copending application having Serial No. 419,686, now Patent No. 2,787,949.

Figure 1:
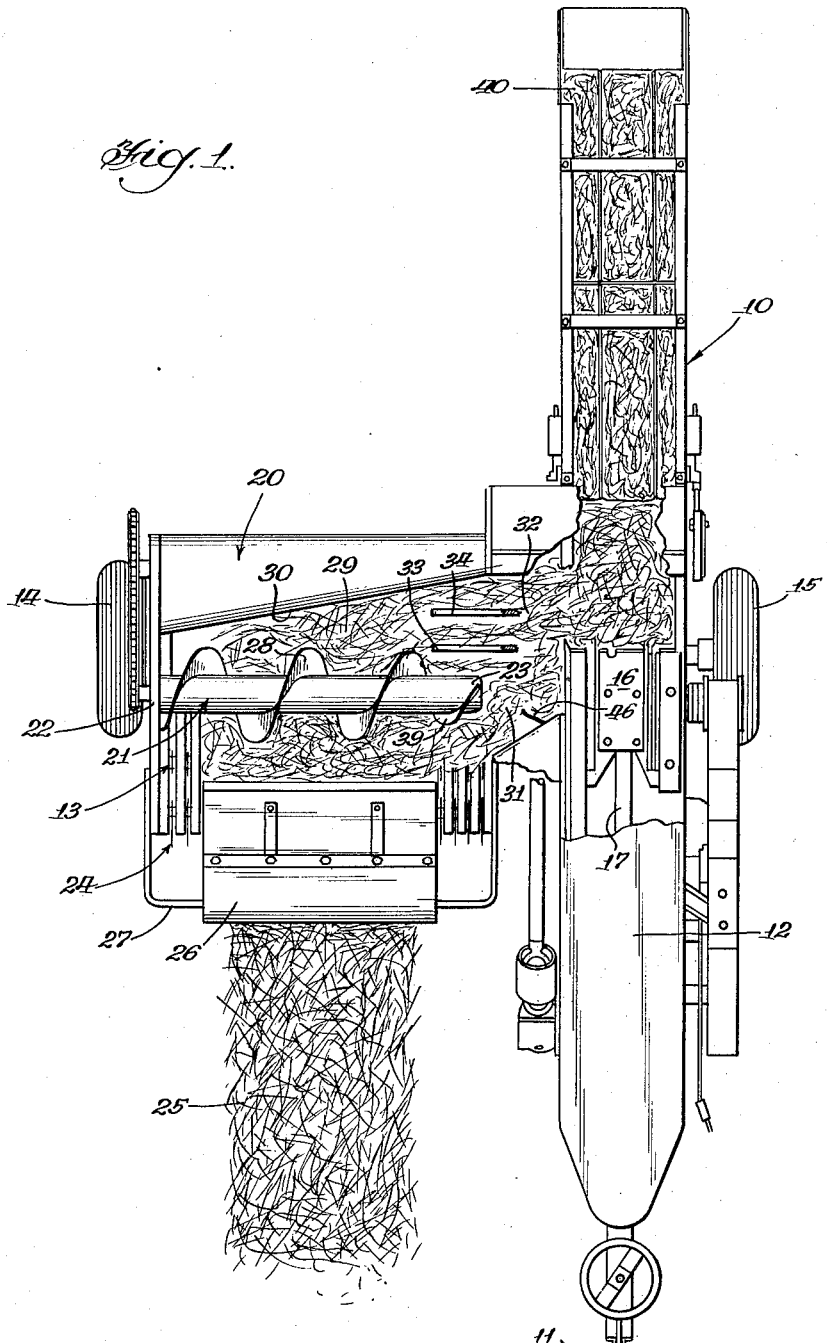
Figure 1 is a top plan view of a hay baler incorporating the principles of this invention and having parts thereof broken away in order to disclose the present invention.

In operation the baler of this invention traverses a field which has previously had its hay laid in windrows. The baler is pulled or otherwise propelled through this field of windrows with the pickup cylinder 24 engaging the hay and throwing it up over the top thereof and against the hold-down member 26 for delivery to the deck 19 of the platform generally at a position beneath the auger conveyer 21. The conveyer 21 is employed for the purpose of feeding hay across the deck 19 toward the longitudinally extending bale-forming chamber 12. The hay is thus fed through the open or unjournalled end 23 of the auger and by means of the forward motion of the hay baler and simultaneously the sweeping action of the spring fingers 46 subsequently defined in detail as 48 and 49 the hay is moved from the chamber 31 to the chamber 32 which has the gyrating fingers 33 and 34 passing therethrough to positively move hay from the platform deck 19 into the bale-forming chamber 12. The reciprocating plunger 16 then causes compression of the hay into bale form as shown at 40. In Figure 2 the plunger 16 in its fully retracted or forward position has the spring fingers 46 nestled within the slots 53 and 54 in the side wall of the plunger so that the plunger may move within the bale-forming chamber without interference. However, the spring 62 causes a normal outward urging of the spring rod fingers 46 so that upon compression stroke of the plunger in the direction of the arrow 47 the fingers 46 will be urged outwardly of the chamber 12 when they reach the opening 18 in the side wall 56 of the chamber 12. Thus the fingers 48 and 49 pass outwardly through the notches 50 and 51 in the inclined wall 45 whereupon they emerge into the area 31 at the discharge end of the auger 21 and continued rearward movement of the plunger causes the spring fingers to sweep past the open end 23 of the auger and deliver hay extruded therefrom rearwardly to a position defined as an area 32 through which the packing fingers 33 and 34 gyrate and sweep the hay into the bale-forming chamber 12 in front of the plunger 16 so that the hay may be formed into bales 40 as shown in Figure 1.

Various details of constructions may be varied throughout a wide range without departing from the principles disclosed herein and I, therefore, do not propose limiting the patent granted hereon otherwise than as necessitated by the appended claims.

What is claimed is:

1. In a hay baler of the type having a transversely extending hay pickup platform, a longitudinally extending bale-forming chamber having a feed opening in one side thereof, an auger conveyer on said platform adapted to feed hay laterally through a discharge end thereof to one side of said platform, means mounting the end of the auger conveyer away from the discharge end on said platform so as to leave the discharge end open and unsupported, said platform having a space behind the discharge end of said auger conveyer, hay packing fingers movable through said space and into a bale-forming chamber, and including a reciprocating plunger in said bale-forming chamber adapted to move from a position forwardly of the feed opening therein to a position rearwardly of the feed opening, fingers carried by said plunger and adapted to extend laterally outwardly of the bale-forming chamber adjacent the platform to sweep hay from the discharging end of the auger into the space through which the hay packing fingers are movable whereby hay discharged from the end of said auger conveyer is pushed into the space through which the hay packing fingers move, and said fingers mounted on the plunger being hingedly mounted and spring biased outwardly whereby when the plunger is retracted into the bale-forming chamber the fingers will be pulled in adjacent the side of the plunger.

2. A device as set forth in claim 1 in which the side of the plunger includes horizontally disposed notches to receive the hinged fingers during movement to the retracted position of the plunger.

3. A device as set forth in claim 2 in which an inclined wall is provided on the platform between the platform and the bale-forming chamber forwardly of the discharge end of the auger conveyer and said inclined wall having notches therein to provide for the emergence of the fingers therethrough to commence movement of hay rearwardly from the area adjacent the discharging end of the auger to the area of the packing fingers.

4. A device as set forth in claim 1 in which the hinged fingers include a vertically disposed hinge pin journalled on the plunger and adapted to carry the fingers thereon, a bracket plate affixed to the vertical hinge pin, a spring mounted on the plunger and the bracket plate and normally urging the vertical hinge pin to rotate in a direction wherein the fingers will be urged outwardly and laterally away from the bale-forming chamber, and stop means limiting the outward extension of the fingers.

References Cited in the file of this patent

UNITED STATES PATENTS

| | | |
|---|---|---|
| 543,278 | Washburn | July 23, 1895 |
| 943,656 | Dain | Dec. 21, 1909 |
| 1,041,521 | Slover et al. | Oct. 15, 1912 |
| 2,787,949 | Bornzin et al. | Apr. 19, 1957 |